(12) United States Patent
Hirst

(10) Patent No.: US 6,396,724 B1
(45) Date of Patent: May 28, 2002

(54) CHARGE-PUMPED DC BIAS SUPPLY

(75) Inventor: B. Mark Hirst, Boise, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/990,145

(22) Filed: Nov. 21, 2001

(51) Int. Cl.[7] .............................................. H02M 7/00
(52) U.S. Cl. ...................................................... 363/125
(58) Field of Search ............................. 363/52, 53, 84, 363/86, 125, 126

(56) References Cited

U.S. PATENT DOCUMENTS

| | | |
|---|---|---|
| 3,930,196 A | 12/1975 | Park et al. |
| 4,535,203 A | 8/1985 | Jenkins et al. |
| 5,268,833 A | 12/1993 | Axer |
| 5,510,972 A | 4/1996 | Wong |
| 5,592,367 A * | 1/1997 | Sugimori et al. .............. 363/17 |
| 6,108,222 A * | 8/2000 | Liang ........................... 363/48 |
| 6,275,397 B1 * | 8/2001 | McClain ...................... 363/127 |

* cited by examiner

*Primary Examiner*—Matthew Nguyen

(57) ABSTRACT

A DC power supply is disclosed. In one aspect, the DC power supply is a DC bias supply connectable to an AC source. The supply includes a first and second input node connectable to the AC source. A pump capacitor is provided having a first terminal coupled to the first input node and having a second terminal. A pump circuit is coupled between the second terminal of the pump capacitor and the second input node and having first and second output nodes. A storage capacitor is coupled between the output nodes, wherein during a first half-cycle of the AC source the pump circuit causes the pump capacitor accumulate a charge and during a second half-cycle of the AC source the pump circuit causes the pump capacitor to transfer to the storage capacitor the accumulated charge, thereby providing a rectified AC output voltage between the output nodes.

19 Claims, 6 Drawing Sheets

CHARGE-PUMPED DC BIAS SUPPLY

CROSS REFERENCE TO RELATED APPLICATIONS

This patent application is related to the following Non-Provisional U.S. patent application Ser. No. 09/990,447, entitled "Synchronous Bridge Rectifier," having is assigned to the same assignee as the present application, and is herein incorporated by reference.

THE FIELD OF THE INVENTION

The present invention relates generally to DC power supplies, and more particularly to a low-power charge-pumped DC bias supply.

BACKGROUND OF THE INVENTION

Power supplies are typically designed with their highest operating efficiency at rated load. However, many electronic devices require a low-power bias supply to maintain power to their various electronic circuits when the devices enter either a standby state or a very low-power mode of operation. Consequently, a power supply designed to supply several hundred watts of power when its associated electronic device is in its active state will typically have efficiencies of less than 30% when the electronic device enters a standby state, and efficiencies of less than 10% when the device is in a very low-power mode of operation.

Conventional bias supplies utilize a bridge rectifier coupled to an AC source to supply a full-wave rectified AC voltage waveform to a charge storage capacitor. The voltage waveform is at a relatively high voltage level (1.414×line voltage), so conventional bias supplies further employ a switch mode bias supply to convert the relatively high voltage to a lower voltage level necessary to power the various electronic circuits which remain active when the associated electronic device is in a reduced power mode of operation. The relatively high voltage level supplied to the bias supply converter increases the cost of the charge storage capacitor as well as the cost of the power converter switch. The relatively high voltages also limit the efficiency of bias supplies to approximately 50% due to voltage and frequency dependant switching losses. Furthermore, current drawn by these bias supplies is rich in harmonics due to the very narrow conduction angle of the diodes and the bridge rectifier.

Many electronic devices, particularly those devices that utilize a very low power mode of operation, would benefit from a low power bias supply that reduces the number of high voltage components required, operates at a high efficiency, is less costly, and reduces generated current harmonics.

SUMMARY OF THE INVENTION

The present invention provides a DC power supply. In one embodiment, the DC power supply is a DC bias supply connectable to an AC source. The supply includes first and second input nodes connectable to the AC source. A first capacitor is provided having a first and second terminals. The first terminal of the first capacitor is coupled to the first input node. A pump circuit having first and second output nodes. The pump circuit is coupled between the second terminal of the first capacitor and the second input node. A second capacitor is coupled between the output nodes of the pump circuit. During a first half-cycle of the AC source the pump circuit causes the first capacitor to accumulate a charge and during a second half-cycle of the AC source the pump circuit causes the first capacitor to transfer the accumulated charge to the second capacitor to provide a rectified AC output voltage between the output nodes of the pump circuit.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the claims.

Figure 1A:
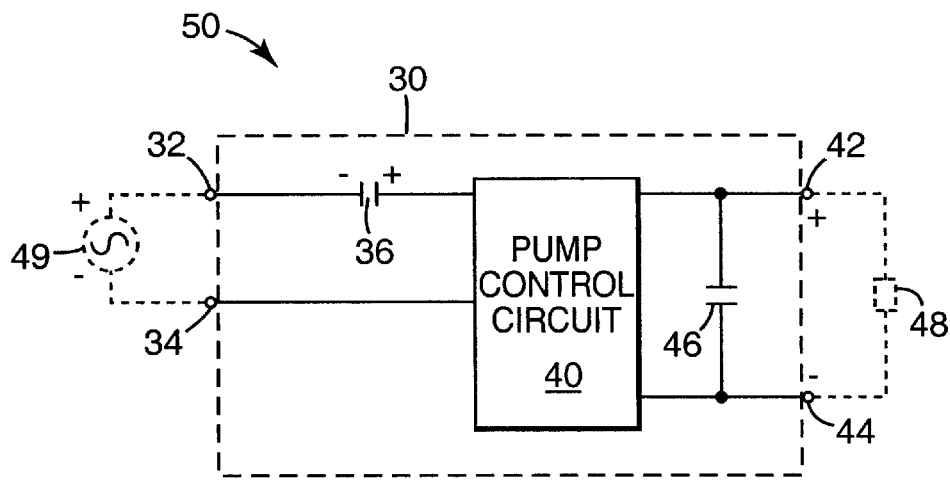
FIG. 1A is a diagram illustrating one exemplary embodiment of a charge pumped DC power supply according to the present invention.

A low-power charge pumped DC bias supply according to the present invention is illustrated generally at 30 in FIG. 1A. Low-power charge pumped DC bias supply 30 comprises a first input node 32, a second input node 34, a pump capacitor 36, a pump control circuit 40 having a positive DC output node 42 and a negative DC output node 44, and a storage capacitor 46.

Low-power charge pumped bias supply 30 is designed to provide a desired DC output voltage level between DC output nodes 42 and 44 to thereby provide the desired DC output voltage level to a load 48 coupled between output nodes 42 and 44. Together, low-power charge pumped bias supply 30 and AC input voltage source 49 form a power source 50 for providing a desired DC output voltage level to load 48. The load 48 can be any load requiring a DC voltage to operate including, but not limited to, a DC converter and a myriad of electronic devices.

Pump capacitor 36 has a first terminal coupled to the first input node 32 and has a second terminal. Pump control circuit 40 is coupled between the second terminal of pump capacitor 36, the second input node 34, and between positive and negative DC output nodes 42 and 44. Storage capacitor 46 is coupled between positive DC output node 42 and negative DC output node 44. During a first half-cycle of AC input voltage source 49, pump control circuit 40 causes pump capacitor 36 to accumulate a charge. During a second half-cycle of AC input voltage source 49, pump control circuit 40 causes pump capacitor 36 to transfer, or "pump," the charge accumulated during the first half-cycle to storage capacitor 46. The charging and pumping of pump capacitor 36 is repeated during each full-cycle of AC input voltage source 49, thereby providing storage capacitor 46 with a half-wave rectified AC current waveform to provide a DC voltage level between positive DC output terminal 42 and negative DC output terminal 44.

Figure 1B:
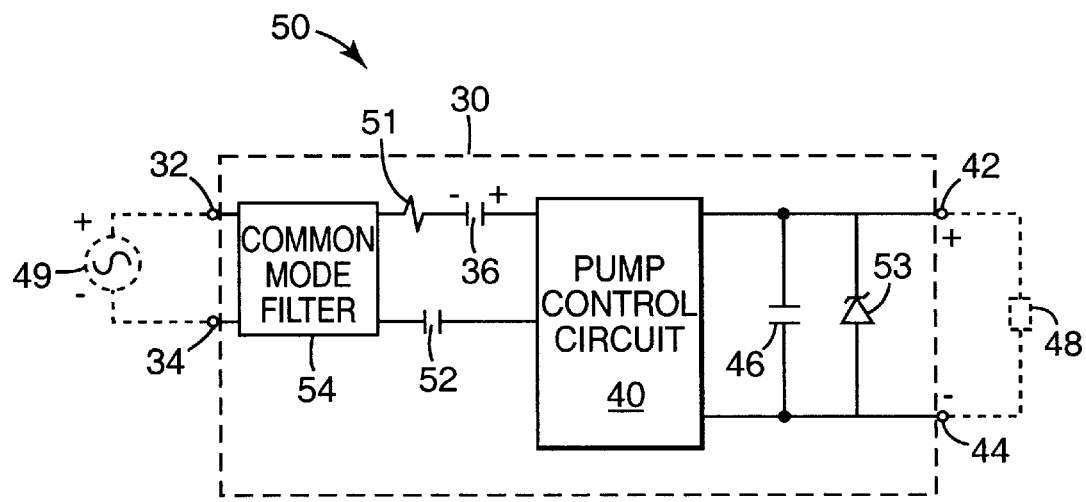
FIG. 1B is a diagram illustrating another exemplary embodiment of a charge pumped DC power supply according to the present invention.

In one embodiment, as illustrated by FIG. 1B, charge pumped circuit 30 further comprises a resistor 51, a capacitor 52, a zener diode 53, and a common mode filter 54. Common mode filter 54 is coupled between input node 32 and a first terminal of resistor 51. Commnon mode filter 54 functions to prevent radio emissions from being injected into AC input source 49. Common mode filters are utilized on nearly all switching power supplies, and are known to those with ordinary skill in the art. Resistor 51 is coupled between common mode filter 54 and pump capacitor 36, and functions to limit surge currents during initial energization of charge pumped circuit 30. Care must be taken when selecting the size of resistor 51. If too large, resistor 51 will adversely affect the efficiency of charge pumped circuit 30. Capacitor 52 is coupled between input node 34 and pump control circuit 40, and functions to provide galvonic isolation from AC input voltage source 49. Capacitor 52 typically is required to be much larger in magnitude than pump capacitor 36. Zener diode 53 is coupled in parallel with storage capacitor 46, with a cathode coupled to positive DC output node 42 and an anode coupled to negative DC output node 44. Zener diode 53 functions to limit the voltage level across storage capacitor 46 during low load conditions.

One embodiment of low-power charge pumped bias supply 30 according to the present invention is illustrated in schematic design form in FIG. 2A and is configured and coupled as described below. Charge pumped bias supply circuit 30 comprises an input node 32, a second input node 34, a pump capacitor 36, charge pump control circuit 40, a positive DC output node 42, a negative DC output node 44, and a storage capacitor 46. Pump control circuit 40 further comprises a first diode 56 and a second diode 58. Pump capacitor 36 has a first terminal coupled to input node 32 and a second terminal coupled to a node 60. Diode 56 has an anode coupled to node 60 and a cathode coupled to positive DC output node 42. Diode 58 has an anode coupled to second input node 34 and a cathode coupled to node 60. Storage capacitor 46 is coupled between positive and negative DC output nodes 42 and 44.

Charge pumped bias supply circuit 30 operates as follows to provide DC power to a load 48 coupled between positive DC output node 42 and negative DC output node 44. With no voltage present between input nodes 32 and 34, all devices are off, and no voltage is present between output nodes 42 and 44. When an AC input voltage is applied between input nodes 32 and 34, such as by AC input voltage source 49, a voltage level is created across diode 58.

During a first quarter-cycle, AC input voltage source 49 is between a first zero-crossing and a negative peak, input node 32 is negative and input node 34 is positive, resulting in diode 58 becoming forward biased. During the first quarter-cycle, diode 56 is reverse-biased and the current path is from input node 34, through diode 54, and back to voltage source 49 via pump capacitor 36. Thus, during the first quarter-cycle, pump capacitor 36 is charged and has a polarity as shown on FIG. 2, with node 60 being the positive pole and input node 32 being the negative pole.

During a second quarter-cycle, AC input source 49 is between a negative peak and a second zero-crossing, input node 32 is negative, input node 34 is positive, diode 56 is forward-biased, and diode 58 is reverse-biased. The polarity of pump capacitor 36 is the same as that during the first-quarter cycle, with node 60 being positive and input node 32 being negative, but pump capacitor 36 is now discharging and the current path is from pump capacitor 36, through diode 56, storage capacitor 46, voltage source 49, and back to pump capacitor 36 via input node 32. Thus, during the second quarter-cycle, pump capacitor 36 provides a current to storage capacitor 46 and begins to transfer, or "pump," its previously stored charge to storage capacitor 46.

During a third quarter-cycle, AC input source 49 is between the second zero-crossing and its positive peak, input node 32 is positive, input node 34 is negative, diode 56 is forward-biased, and diode 58 is reverse-biased. The polarity of pump capacitor 36 is reversed from the second quarter-cycle, with node 32 being positive and node 60 being negative, and pump capacitor continues to "pump" current to storage capacitor 46. Current follows a path from voltage source 49, through pump capacitor 36, diode 56, and back to voltage source 49 via storage capacitor 46. During the third quarter-cycle, pump capacitor 36 completes transferring its previously stored charge to storage capacitor 46.

During a fourth quarter-cycle, AC input source 49 is between the positive peak and a third zero-crossing, input node 32 is positive, input node 34 is negative, diode 56 is reverse-biased, and diode 58 is forward-biased. The polarity of pump capacitor 36 is the same as that during the third-quarter cycle, with input node 32 being positive and node 60 being negative, but the current path is now voltage source 49, through diode 58 and back to voltage source 49 via pump capacitor 36. Storage capacitor 46 receives no charging current during the fourth quarter-cycle.

The above sequence of quarter-cycles one through four is repeated during each full-cycle of AC voltage source 49, resulting in a half-wave rectified current waveform being supplied to storage capacitor 46. As a result, a DC voltage level is created across the terminals of storage capacitor 46 between output nodes 42 and 44, with node 42 being the positive terminal and node 44 the negative terminal. Because of the half-wave rectified current waveform provided to storage capacitor 46, the general embodiment illustrated by charge pumped bias supply circuit 30 in FIG. 2 is hereinafter referred to as a half-wave charge pump. This embodiment is also hereinafter referred to a as a "negative" charge pump, as storage capacitor 36 is charged during the negative half of AC input voltage source 49's waveform.

A prototype circuit of charge pumped bias supply circuit 30 of FIG. 2 utilizing values of 1 $\mu f$ for pump capacitor 36, 330 $\mu f$ for storage capacitor 46, 1 kilo-ohm for load 48, and 120 Vrms at 60 Hz for AC input voltage source 49 demonstrates the efficiency of the present design. The efficiency is calculated as described below.

The power consumed by a device, P, can be calculated by Equation I below:

$$P = V*I, \qquad \text{Equation I}$$

where
V=voltage across the device; and
I=current flow through the device.
Using the values stated above the voltage across load 48 of the prototype circuit, between output nodes 42 and 44, had a measured value of 18 Vdc with a load current of 18 mA. Applying the measured values to Equation I, the power delivered to load 48, $P_{DEL}$, equals:

$$P_{DEL} = 18 \text{ Vdc} * 18 \text{ mA} = 324 \text{ mW}.$$

While the prototype circuit provided a power level of 324 mW, it is noted that low-power bias supply circuit 32 can be "tuned" to match the power requirements of the connected load. The power level provided by low-power bias supply circuit 30 can be increased or decreased based on the value of pump capacitor 32. The value of pump capacitor 32 is increased to increase the power level and decreased to decrease the power level.

To calculate the losses in diode 52 and diode 54, an average current must be calculated. The average current $I_{AVG}$ can be calculated using Equation II below:

$$I_{AVG} = \frac{C * V * 2}{T} \qquad \text{Equation II}$$

Where

C=pump capacitor value;

V=peak input voltage; and

T=period of sinusoidal input voltage (i.e., 1/60 second @ 60 Hz.).

The peak voltage in Equation II is multiplied by "2", because current is flowing as the capacitor is charged from $-V_{PEAK}$ to $+V_{PEAK}$. Based on the values of the illustrative example, average current $I_{AVG}$ equals:

$$I_{AVG} = \frac{1uf * (120 * \sqrt{2})}{1/60 \sec.} = 10 \text{ mA}$$

The determination of $I_{AVG}$ is an iterative process. The voltage across a device is equal to V=I*R. Thus, the voltage across load 48 equals (20.36 mA)*(1000 ohms), or 20.36 Volts. The voltage across load 48 reduces the load across the pump capacitor, so a second calculation of $I_{AVG}$ is made via Equation II using the reduced voltage as follows:

$$I_{AVG} = \frac{1uf \left[ (120 * \sqrt{2}) - 20.36 \right]}{1/60 \sec.} = 19 \text{ mA}$$

Assuming a forward voltage drop of 0.5 VDC across each diode 52 and 54, and using Equation I above, the power loss for each diode equals:

$$P_{Loss} = 0.5 \text{ VDC} * 19 \text{ mA} = 9.5 \text{ mW}.$$

Thus, the combined power loss for diodes 52 and 54 equals 19 mW.

The efficiency of the prototype of charge pump bias supply circuit 30 can be calculated using the following Equation III:

$$\text{Efficiency} = \frac{PDEL}{PDEL + PLOSS} * 100 \qquad \text{Equation III}$$

Thus, the efficiency of the prototype of charge pump bias supply circuit 30, as illustrated in FIG. 2, equals:

$$\text{Efficiency} = \frac{324 \text{ mW}}{324 \text{ mW} + 14 \text{ mW}} * 100 = 95\%$$

Currently, switch-mode power supplies with capacities of one watt or less generally suffer from high losses, and consequently have poor energy efficiencies. Efficiencies of less than 30% are typical. The majority of these losses are switching losses that occur when the switch is performing the primary voltage conversion. These losses result from a parasitic inductance which causes current to keep flowing through the switch as the switch is turning off and voltage across the switch begins to rise. The switching loss caused by the parasitic inductance can be calculated according to the following Equation IV:

$$P_S = \frac{V^2 * fs(T_{ON} + T_{OFF})}{2 * (R_{LOAD} + R_{DSO})} \qquad \text{Equation IV}$$

where

V=supply voltage;

fs switching frequency;

$R_{DSO}$=switch conduction resistance;

$R_{LOAD}$=load resistance;

$T_{ON}$=time for switch to turn on; and $T_{OFF}$=time for switch to turn off.

From Equation IV above, it is apparent that the switching losses are proportional to the square of the supply voltage. Thus, if the supply voltage can be decreased, the power supply's switching losses will be reduced by a factor equal to the square of the voltage decrease. As an example, if the supply voltage V is reduced from 170 volts to 17 volts, the switching loss will be reduced by a factor of 100. The present invention represents an efficient and economical method for reducing the source voltage.

Figure 2A:
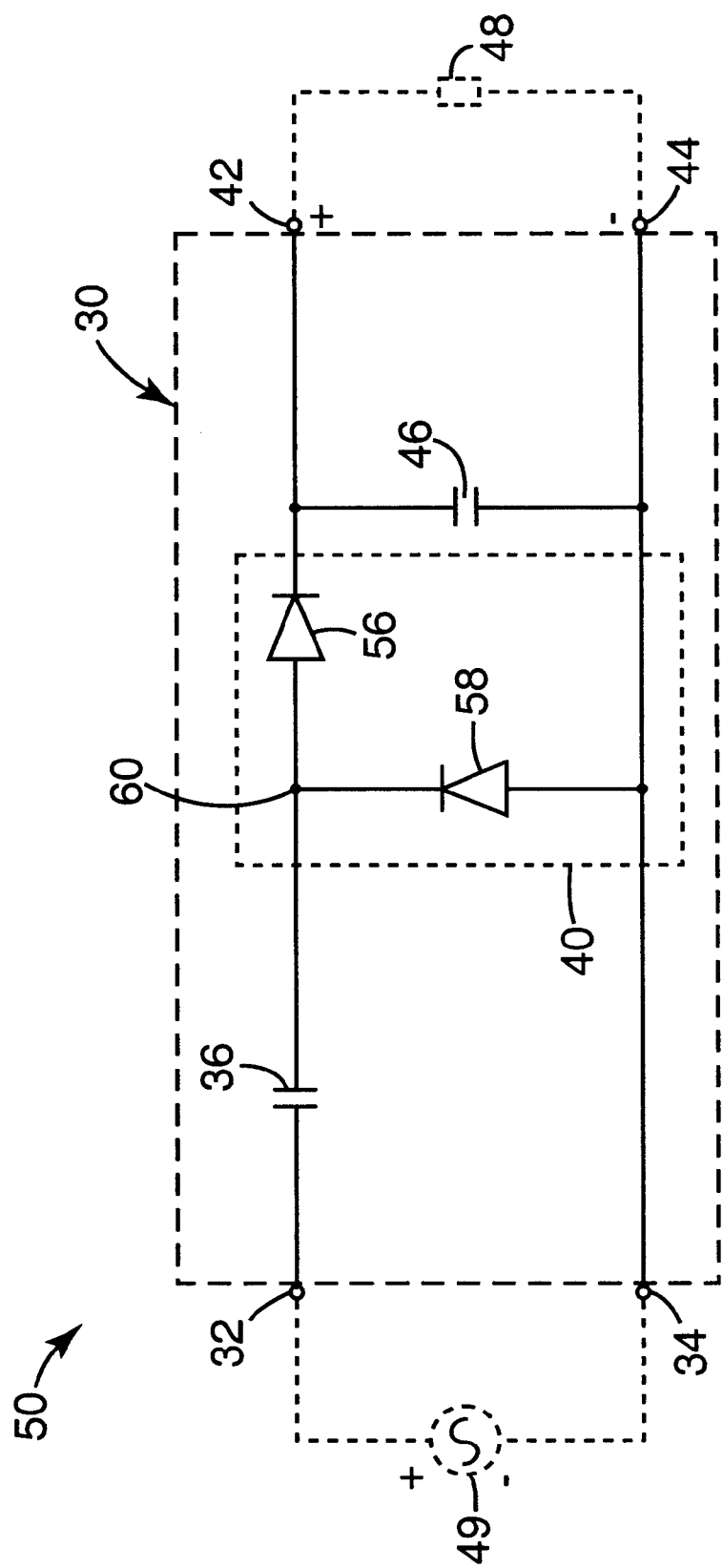
FIG. 2A is a schematic diagram of one exemplary embodiment of a half-wave charge pumped DC power supply according to the present invention.
Figure 2B:
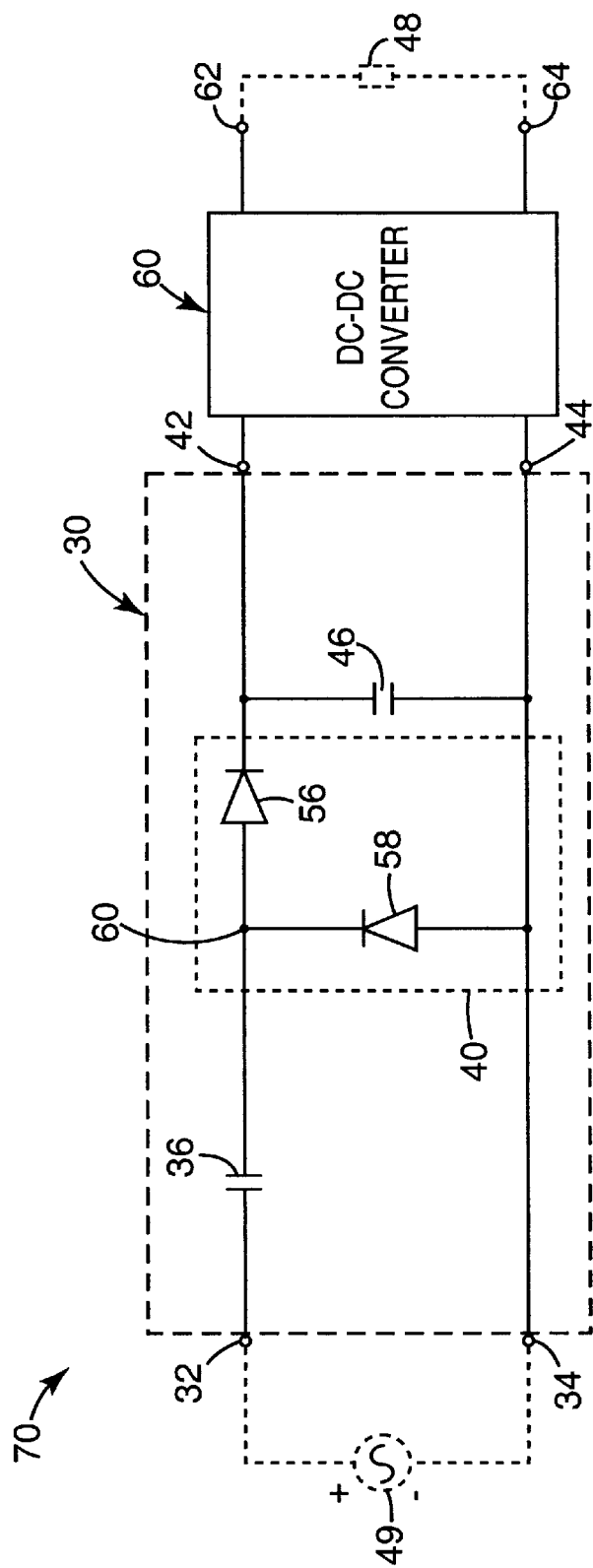
FIG. 2B is a schematic diagram of one exemplary embodiment of a half-wave charge pumped DC power supply according to the present invention.

Accordingly, one embodiment of the present invention, as illustrated by FIG. 2B, couples low-power bias supply circuit 30 of FIG. 2A with a switch-mode DC-to-DC converter 60. DC-to-DC converter 60 is coupled between output nodes 42 and 44 and provides improved voltage regulation to load 48 coupled between output nodes 62 and 64. Together, low-power bias supply circuit 30 and DC-to-DC converter form a DC bias supply 70. Assuming the same values for pump capacitor 36, storage capacitor 42 and AC voltage source 49 as used in the illustrative example above, low-power bias supply circuit 30 will be 94.5% efficient and provide a voltage level of 18 volts to DC-to-DC converter 60. The reduction in voltage being supplied to DC-to-DC converter from approximately 170 Vdc (120 * 1.414) to 18 Vdc boosts the efficiency of converter 60 to approximately 95%. The combined efficiency of DC bias supply 70 is equal to the product of (94.5% * 95%), or 90% with a connected load 49 of 324 mW. In addition to improving the efficiency of DC-to-DC converter 60, the reduced input voltage allows DC-to-DC converter 60 to utilize lower voltage components which in-turn reduces costs.

Figure 3:
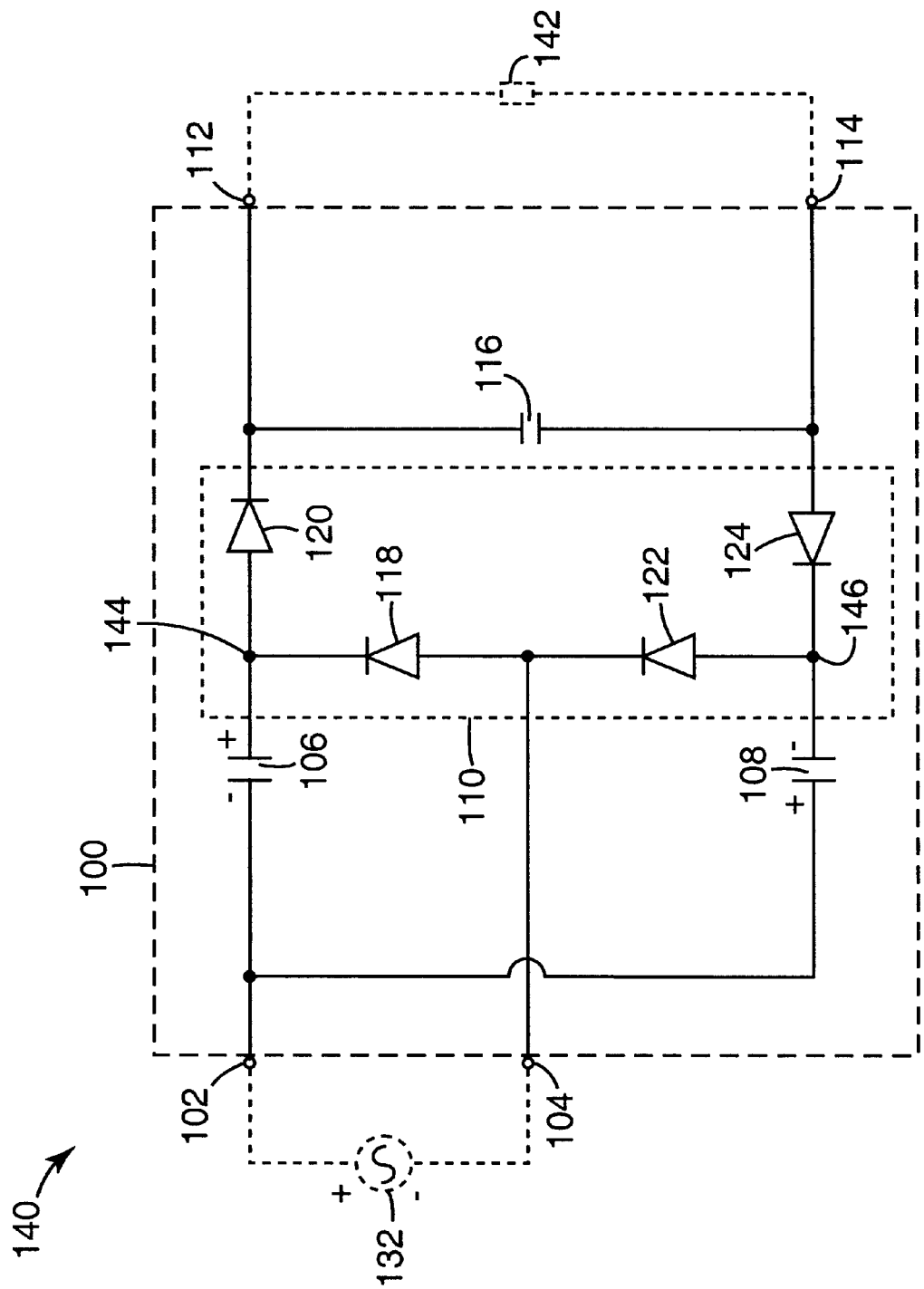
FIG. 3 is a schematic diagram of one exemplary embodiment of a low-power full-wave charge pumped DC power supply according to the present invention.

In one embodiment, "negative" charge pumped circuit 30 of FIG. 2A is combined with a "positive" charge pumped circuit to form a full-wave charge pumped circuit 100 as illustrated by FIG. 3. Full-wave charge pumped circuit 100 comprises a first input node 102, a second input node 104, a first charge pump capacitor 106, a second charge pump capacitor 108, a charge pump control circuit 110, a positive DC output node 112, a negative DC output node 114, and a storage capacitor 116. Charge pump control circuit 110 further comprises diodes 118, 120, 122 and 124. Low-power charge-pumped bias supply 100 is designed to provide a full-wave rectified AC current waveform to storage capacitor 116 to thereby provide a DC voltage between output terminals 114 and 116. Together, full-wave charge pumped circuit 100 and AC input voltage source 132 form a low-power DC power supply 140 for providing DC power to a load 142.

Full-wave charge pumped circuit 100 is configured as described below. First pump capacitor 106 is coupled between input node 102 and a node 144. Diode 118 has a cathode coupled to node 144 and an anode coupled to input node 104. Diode 120 has an anode coupled to node 144 and a cathode coupled to positive DC output node 112. Second pump capacitor 108 is coupled between input node 102 and a node 146. Diode 122 has a cathode coupled to input terminal 104 and an anode coupled to node 146. Diode 124 has a cathode coupled to node 146 and an anode coupled to negative DC output node 114. Storage capacitor 116 is coupled between positive and negative DC output nodes 112 and 114, respectively.

Figure 4:
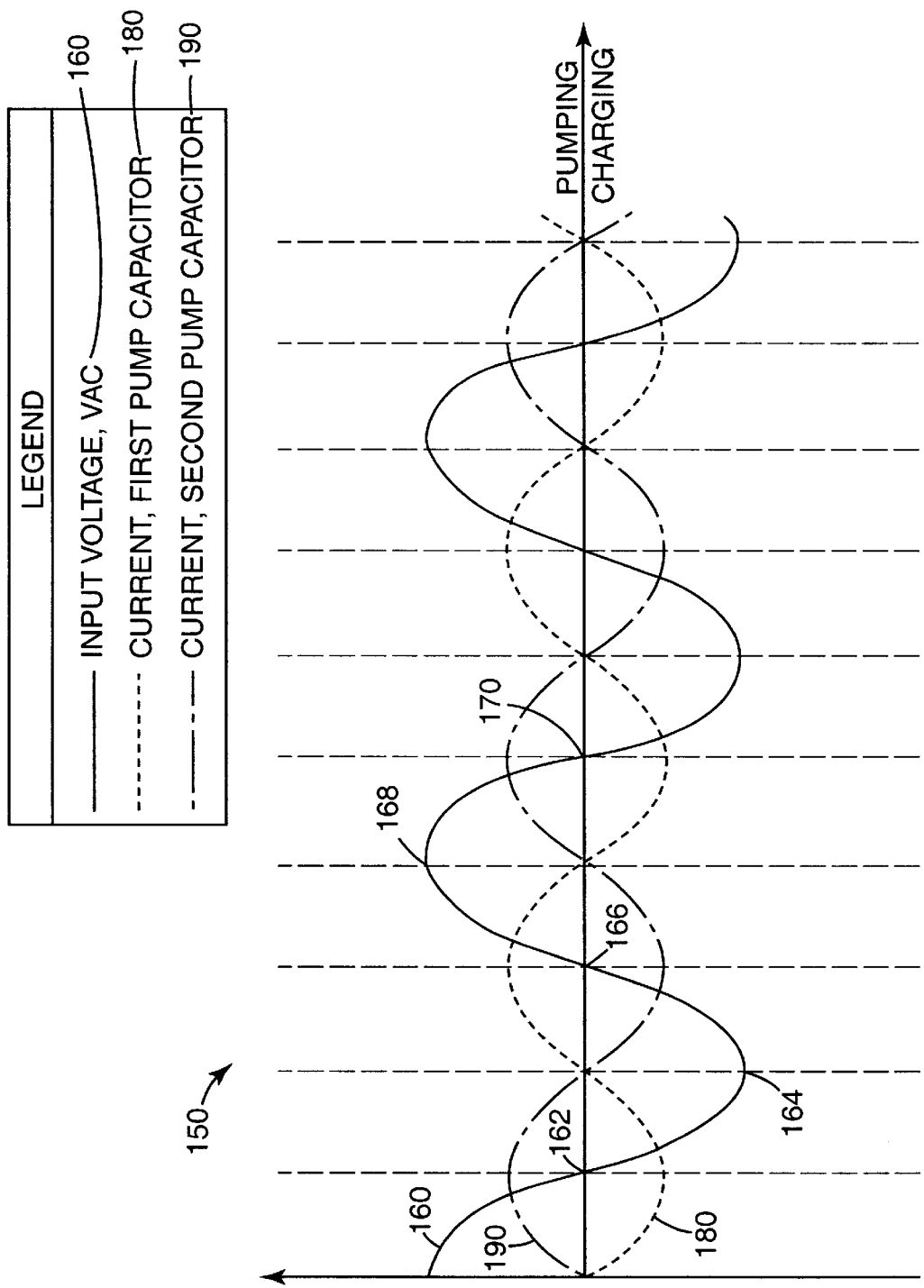
FIG. 4 is a graph illustrating the relationship between an input voltage source waveform and pump capacitor current waveforms for the full-wave charge pumped power supply of FIG. 3.

Charge pumped bias supply 100 operates as follows to provide DC power to a load 142 coupled between positive DC output node 112 and negative DC output node 114. FIG. 4 is a graph illustrating the relationship between a input voltage source waveform 160 and current waveforms 162 and 180 of pump capacitors 106 and 108, respectively, and is included to aid in describing the operation of full-wave bias supply circuit 100. With no voltage source present at input nodes 102 and 104, no voltage is present across output nodes 112 and 114. When AC input source 132 is applied across input nodes 102 and 104, a voltage level is created across both diodes 118 and 122.

During a first quarter-cycle, AC input voltage source waveform 160 is between a first zero-crossing 162 and a negative peak 164, input node 102 has a negative polarity, input node 104 has a positive polarity, diodes 118, 120 and 124 are forward-biased, and diode 122 is reverse-biased. Current follows a path from input node 104 through diode 118 to node 144, at which point the path bifurcates, with a first path being through first charge pump capacitor 106 and back to input voltage source 132 via input node 102, and a second path being through diode 120, storage capacitor 116, diode 124, second pump capacitor 108 and back to input voltage source 132 via input node 102. During the first quarter-cycle, first pump capacitor 106 is charging and has a polarity as shown in FIG. 3, with input node 102 being negative and node 144 being positive. Conversely, second charge pump capacitor 108 has a polarity opposite of that shown in FIG. 3, with input node 102 being negative and node 146 being positive, and is discharging, thereby providing a current to storage capacitor 116 and transferring, or "pumping," a previously stored charge to storage capacitor 116.

During a second quarter-cycle, AC input voltage source waveform 160 is between negative peak 164 and a second zero-crossing 166, input node 102 has a negative polarity, input node 104 has a positive polarity, diodes 120, 122 and 124 are forward-biased, and diode 118 is reverse-biased. Current follows a path from input node 102 through first pump capacitor 106, diode 120, storage capacitor 116, diode 124, diode 122, and back to input voltage source 132 via input node 104. Current also follows a path from input node 102 through second pump capacitor 108, diode 122, and back to voltage source 132 via input node 104. During the second quarter-cycle, first pump capacitor 106 again has a polarity as shown in FIG. 3, with input node 102 being negative and node 144 being positive, and is discharging, thereby providing a current to storage capacitor 116 and transferring, or "pumping," the previously stored charge to storage capacitor 116. Second charge pump capacitor 108 has a polarity opposite of that shown in FIG. 3, with input node 102 being negative and node 146 being positive, and is in a process of "resetting" the polarity for charging during a third quarter-cycle.

During the third quarter-cycle, when AC input source waveform 160 is between second zero-crossing 166 and a positive peak 168, input node 102 has a positive polarity, input node 104 has a negative polarity, diodes 120, 122 and 124 are forward-biased, and diode 118 is reverse-biased. Current follows a path from input node 102 through first pump capacitor 106, diode 120, storage capacitor 116, diode 124, diode 122, and back to input voltage source 132 via input node 104. Current also follows a path from input node 102 through second pump capacitor 108, diode 122, and back to voltage source 132 via input node 104. During the third quarter-cycle, first pump capacitor 106 has a polarity opposite of that shown in FIG. 3, with input node 102 being positive and node 144 being negative, but continues discharging and completes '"pumping," the previously stored charge to storage capacitor 116. Second charge pump capacitor 108 is charging, and has a polarity as shown in FIG. 3, with input node 102 being positive and node 146 being negative.

During a fourth quarter-cycle, when AC input source waveform 160 is between positive peak 168 and a third zero-crossing 170, input node 102 has a positive polarity, input node 104 has a negative polarity, diodes 118, 120 and 124 are forward-biased, and diode 122 is reverse-biased. Current follows a path from input node 104 through diode 118 to node 144, at which point the path bifurcates, with a first path being through first charge pump capacitor 106 and back to input voltage source 132 via input node 102, and a second path being through diode 120, storage capacitor 116, diode 124, second pump capacitor 108 and back to input voltage source 132 via input node 102. During the fourth quarter-cycle, first pump capacitor 106 again has a polarity opposite of that shown in FIG. 3, with input node 102 being positive and node 144 being negative, and is in a process of "resetting" the polarity for charging during the next quarter-cycle. Second pump capacitor 108 has a polarity as shown in FIG. 3, with input node 102 being positive and node 146 being negative, and is discharging, thereby providing a current to storage capacitor 116 and transferring, or "pumping," the previously stored charge to storage capacitor 116.

The above sequence of quarter-cycles one through four is repeated during each full-cycle of AC voltage source 132, resulting in a full-wave rectified current waveform being supplied to storage capacitor 116. As a result, a DC voltage level is created across the terminals of storage capacitor 116 between output nodes 112 and 114, with node 112 being the positive node and node 114 the negative node. Because of the full-wave rectified current waveform provided to storage capacitor 116, storage capacitor 116 is charged during the full-cycle of AC input voltage source 132. Thus, the general embodiment illustrated by low-power charge pumped bias supply circuit 100 in FIG. 2 is referred to as a full-wave charge pump.

A prototype of full-wave charge pumped bias supply 100 utilizing values of 1 $\mu f$ for each pump capacitor 106 and 108, 120 Vrms for input voltage source 132, and 2 kilo-ohms for load 142, provided a measured output power level of 648 mW at 36 Vdc.

$$\text{Efficiency} = \frac{648\,\text{mW}}{648\,\text{mW} + 2(19\,\text{mW})} \times 100 = 97.2\%$$

In addition to improved efficiency, low-power DC power supply 140 provides other advantages over current power supplies. First, because the "charge pumping" action keeps "rectifying" diodes 118, 120, 122 and 124 in nearly continuous conduction, very little current harmonics are generated and presented to AC input voltage source 132. Furthermore, because pump capacitors 106 and 108 are almost constantly transferring charge to pump capacitor 116 during the entire waveform of AC input voltage source 132, a smaller value of capacitance can be used for storage capacitor 116, thereby reducing costs.

Figure 5:
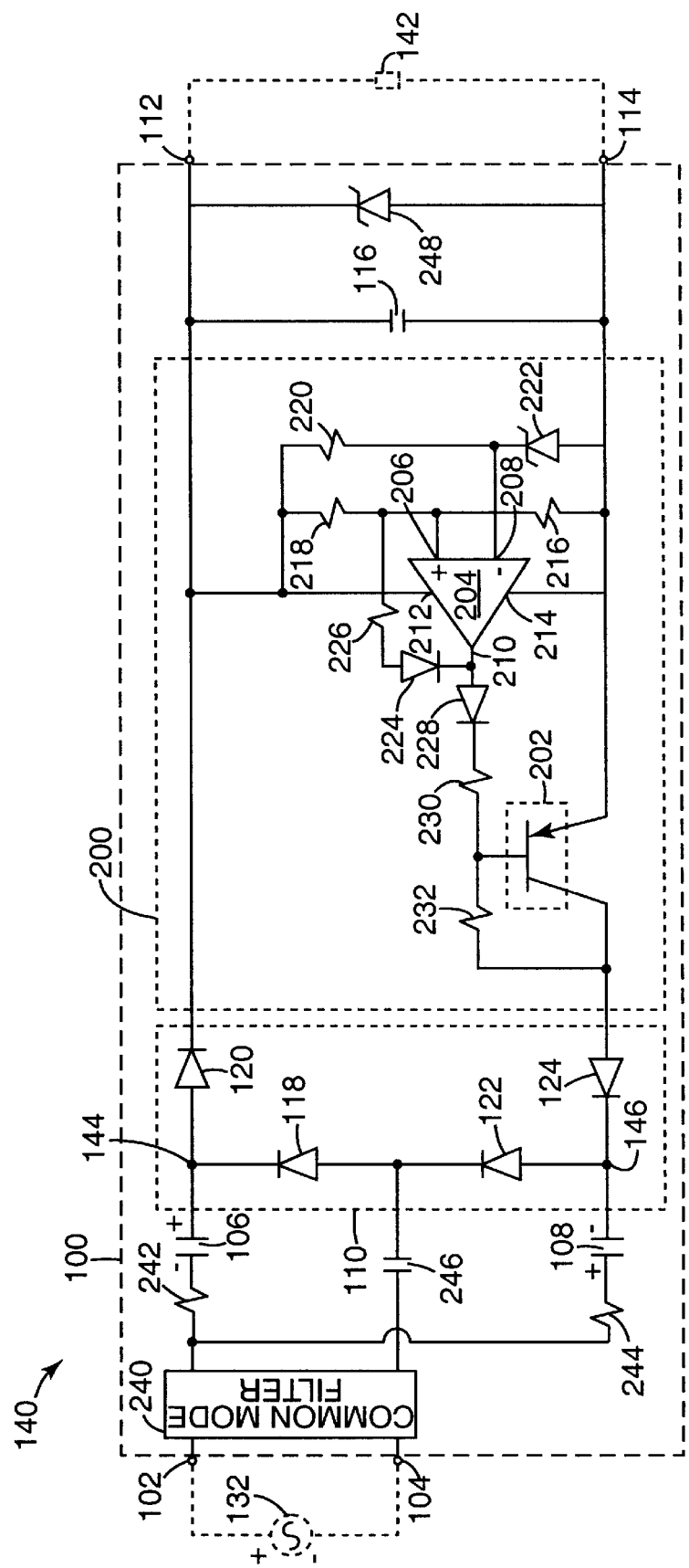
FIG. 5 is a schematic diagram illustrating another exemplary embodiment of charge pumped DC power supply according to the present invention.

In one embodiment, as illustrated by FIG. 5, full-wave charge pump circuit 100 further comprises a universal voltage interface circuit 200. a common-mode filter 240, a resistor 242, a resistor 244, a capacitor 246, and a zener diode 248. Universal voltage interface circuit 200 functions to maintain the output voltage across storage capacitor 116 within a desired range, and is configured and described below.

Universal voltage interface circuit 200 is configured as described below. A p-channel metal-oxide field effect transistor (PMOS) 202 has a drain coupled to the anode of diode 124, a source coupled to negative DC output node 114, and a gate. An operational amplifier 204 has a non-inverting terminal 206, an inverting terminal 208, an output terminal 210, a negative voltage terminal 212 coupled to positive DC output node 112, and a positive voltage terminal 214 coupled to negative DC output terminal 114. A resistor 216 is coupled between negative DC output node 114 and non-inverting terminal 206, and a resistor 218 is coupled between positive DC output node 112 and non-inverting terminal 206. A resistor 220 is coupled between positive DC output node 112 and inverting terminal 208, and a zener diode 222 has an anode coupled to output node 114 and a cathode coupled to inverting terminal 208. A diode 224 has a cathode coupled to output terminal 210 and an anode coupled to a first terminal of a resistor 226, a second terminal of which is coupled to non-inverting terminal 206. A diode 228 has an anode coupled to a first terminal of a resistor 230, a second terminal of which is coupled to the gate of PMOS transistor 202. Finally, a resistor 232 is coupled between the anode of diode 124 and the gate of PMOS transistor 202.

Universal voltage interface circuit 200 utilizes hysteresis to control the charging of storage capacitor 116 to thereby maintain the output voltage level across storage capacitor 116 within a window having an upper voltage limit and a lower voltage limit. When first energized, the output voltage level is below the upper voltage limit and PMOS transistor is forward-biased and is conducting current from its source to its drain, thereby allowing storage capacitor 116 to charge. When the output voltage level exceeds the upper voltage limit. PMOS transistor 202 become reverse-biased and no longer conducts current, thereby inhibiting the charging of storage capacitor 116. When the output voltage level drops below the lower voltage limit, PMOS transistor 202 is again forward-biased, thereby allowing the charging of storage capacitor 116 to resume. The values of the devices utilized by universal voltage interface circuit 200 can be selected to set the upper and lower voltage limits at levels appropriate for associated load 142.

Although FIG. 5 indicates diode 124 as remaining in pump control circuit 110, diode 124 is redundant to voltage interface 200 and can be removed. Additionally, it is noted that voltage interface 200 can be configured to replace diode 120 rather than diode 124. Furthermore, voltage interface 200 can also be applied is a similar fashion to the half-wave charge pumped bias supply 30 illustrated by FIG. 2A.

Common mode filter 240 is coupled between input nodes 102 and 104, and between resistor 242 and capacitor 244. Common mode filter 240 functions to prevent radio frequency emissions from being injected into AC input voltage source 132 from charge pump circuit 100. The exact configuration of common mode filter 240 is not discussed, as common mode filters are routinely used in switching power supplies and are known to those possessing ordinary skill in the art.

Resistor 242 is coupled between common mode filter 240 and pump capacitor 106, and resistor 244 is coupled between common mode filter 240 and pump capacitor 108. Resistors 242 and 244 each function to limit inrush current during initial energization of charge pump circuit 100. Alternatively, in place of resistors 242 and 244, a single resistor can be coupled between input node 102 and common mode filter 240 to perform the same function. Regardless of whether the single resistor or resistors 242 and 244 are used, the efficiency of charge pump circuit 110 will be adversely affected if the values of the resistors are too large.

Capacitor 246 is coupled between common mode filter 240 and the anode of diode 118. and functions to provide galvonic isolation from AC input voltage source 132. Capacitor 246 needs to be sized larger in magnitude than pump capacitors 106 and 108. For instance, design equations hold when capacitor 246 is sized ten times larger than pump capacitors, but other values are possible. Zener diode 248 has a cathode coupled to output node 112 and an anode coupled to output node 114, and functions to limit the voltage level across storage capacitor 116 during low load conditions.

In summary, a DC power supply according to the present invention has several advantages over current power supply designs. First, at low-power levels (levels of one watt or less) a DC power supply according to the present invention is far more efficient than typical DC power supplies, having an efficiency up to 95% as compared to an efficiency generally less than 30% for typical power supplies. Also, because the "charge pumping" action keeps the "rectifying" diodes in nearly continuous conduction. very little current harmonics are generated as compared to current designs. In addition, because the pump capacitors are almost constantly transferring charge to the storage capacitor during the entire AC input voltage waveform, a smaller value of capacitance can be used for storage capacitor, thereby reducing costs. Furthermore, if used in conjunction with a switched-mode converter, the lower input voltage provided to the switched-mode converter by the present invention greatly increases the efficiency of the converter and also allows lower voltage circuit components to be utilized, again reducing costs.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A DC bias supply connectable to an AC source, the bias supply comprising:
   first and second input nodes connectable to the AC source;
   a first capacitor having a first terminal and a second terminal, the first terminal coupled to the first input node;
   a pump circuit coupled between the second terminal of the first capacitor and the second input node, the pump circuit having first and second output nodes; and
   a second capacitor coupled between the output nodes of the pump circuit, wherein during a first half-cycle of the AC source the pump circuit causes the first capacitor to accumulate a charge and during a second half-cycle of the AC source the pump circuit causes the first capacitor to transfer the accumulated charge to the second capacitor to provide a rectified AC voltage between the output nodes.

2. The bias supply of claim 1, wherein the pump circuit comprises:
   a first diode having an anode coupled to the second terminal of the first capacitor and a cathode coupled to the first output node of the pump circuit; and
   a second diode having an anode coupled to the second output node of the pump circuit and a cathode coupled to the second terminal of the first capacitor.

3. The bias supply circuit of claim 1, wherein a zener diode is coupled between the output nodes to limit the voltage across the output nodes during low load conditions.

4. The bias supply circuit of claim 1, wherein a resistor is coupled between the first input node and the first capacitor to limit inrush current.

5. The bias supply of claim 1, further comprising a DC-DC converter coupled across the output nodes to provide improved voltage regulation.

6. The bias supply of claim 1, further comprising a common mode filter coupled between the AC source and the first and second input nodes.

7. The bias supply of claim 1, further comprising a voltage interface coupled between the pump circuit and the output nodes to maintain within a voltage range the voltage level across the output nodes.

8. A method of providing a DC voltage level from an AC voltage source having an AC voltage level, the method comprising:
   receiving the AC voltage level from the AC voltage source;
   storing in a capacitor a charge having a magnitude and a polarity during a first half-cycle of the voltage source and transferring the charge to a storage capacitor during a second half-cycle of the AC voltage source to provide a half-wave rectified AC output voltage level across the storage capacitor as the DC output voltage level.

9. A DC bias supply connectable to an AC source, the bias supply comprising:
   first and second input nodes connectable to the AC source;
   a first capacitor having a first terminal and a second terminal, the first terminal coupled to the first input node;
   a second capacitor having a first terminal and a second terminal, the first terminal coupled to first input node;
   a pump circuit coupled between the second terminals of the capacitors and the second input node, the pump circuit having first and second output nodes; and
   a storage capacitor coupled between the output nodes, wherein during a first half-cycle of the AC source the pump circuit causes the first capacitor to accumulate a first charge having a polarity and the second capacitor to transfer to the storage capacitor a previously accumulated second charge having the same polarity, and during a second half-cycle of the AC source causes the second capacitor to re-accumulate the second charge and the first capacitor to transfer to the storage capacitor the first charge to provide a fully rectified AC voltage across the output nodes.

10. The bias supply of claim 9, wherein the pump circuit comprises:
    a first diode having a cathode coupled to the second terminal of the first capacitor and an anode coupled to the second input node;
    a second diode having a cathode coupled to the second input node and an anode coupled to the second terminal of the second capacitor;
    a third diode having an anode coupled to the second terminal of the first capacitor and a cathode coupled to the first output node; and
    a fourth diode having a cathode coupled to the second terminal of the second capacitor and an anode coupled to the second output node.

11. The bias supply circuit of claim 9, wherein a first resistor is coupled between the first input node and the first pump capacitor and a second resistor is coupled between the first input node and the second pump capacitor to reduce inrush current.

12. The bias supply of claim 9, wherein a resistor is coupled between the AC source and the first input node to reduce inrush current.

13. The bias supply of claim 9, wherein a common mode filter is coupled between the AC source and the first and second input nodes to prevent radio frequency emissions from being inject in the AC source.

14. The bias supply of claim 9, wherein a capacitor is coupled between the AC source and the second input node to provide galvonic isolation.

15. The bias supply of claim 9, wherein a zener diode is coupled between the output nodes to limit the voltage across the output nodes during low load conditions.

16. The bias supply of claim 9, wherein a voltage interface is coupled between the pump circuit and the output nodes to maintain within a voltage level range the voltage level across the output nodes.

17. The voltage interface of claim 16 comprising:
    a transistor having a source coupled to the second output node, a drain coupled to the anode of the fourth diode, and a gate;
    an operational amplifier having an inverting terminal, a non-inverting terminal, an output terminal, a negative terminal coupled to the first output node, and a positive terminal coupled to the second output node;
    a resistor coupled between the second output node and inverting terminal;
    a resistor coupled between the first output node and non-inverting terminal;
    a resistor coupled between the first output node and inverting terminal;
    a resistor coupled between the gate and drain; and
    a fifth diode having an anode coupled to the output terminal and a cathode;
    a resistor coupled between the gate and fifth diode cathode;
    a sixth diode having a cathode coupled to the output terminal and an anode;

a resistor coupled between the non-inverting terminal and sixth diode anode; and a zener diode having an anode coupled to the second output node and a cathode coupled to the inverting terminal.

18. The bias supply of claim 9, further comprising a DC-DC converter coupled across the output nodes to provide improved voltage regulation.

19. A method of providing a DC voltage level from a voltage source having an AC voltage level, the method comprising:

receiving the AC voltage level from the voltage source;

storing in a first capacitor a charge having a magnitude and polarity and transferring from a second capacitor to a storage capacitor a previously stored charge having substantially the same magnitude and polarity as the stored charge in the first capacitor during a first half-cycle of the voltage source; and storing in the second capacitor a charge having a magnitude and polarity and transferring from the first capacitor to a storage capacitor the previously stored charge having substantially the same magnitude and polarity as the stored charge in the second capacitor during a second half-cycle of the voltage source to provide a full-wave rectified AC output voltage level across the storage capacitor as the DC output voltage level.

* * * * *